Feb. 20, 1923.

W. P. LOTZ.
SPUR GEAR TESTING FIXTURE.
FILED FEB. 3, 1921.

1,445,631.

INVENTOR
Walter P. Lotz
BY
Redding & Greeley
his ATTORNEYS

Patented Feb. 20, 1923.

1,445,631

UNITED STATES PATENT OFFICE.

WALTER P. LOTZ, OF NEW BRUNSWICK, NEW JERSEY, ASSIGNOR TO INTERNATIONAL MOTOR COMPANY, OF NEW YORK, N. Y., A CORPORATION OF DELAWARE.

SPUR-GEAR-TESTING FIXTURE.

Application filed February 3, 1921. Serial No. 442,186.

*To all whom it may concern:*

Be it known that I, WALTER P. LOTZ, a citizen of the United States, residing in New Brunswick, in the State of New Jersey, have invented certain new and useful Improvements in Spur-Gear-Testing Fixtures, of which the following is a specification, reference being had to the accompanying drawing, forming a part hereof.

This invention relates to a simple and inexpensive gear testing fixture for spur gears. It has been the usual practise in gear testing fixtures to mount the master gear on a relatively heavy and expensive gib slide so that it might be drawn into and out of mesh with the gear under test. In such fixtures and others the axes of the gears have usually been vertical, thereby preventing the tester from using a stone or file on the teeth to correct inaccuracies as they were indicated during test. In fact, it was necessary upon indication of an inaccuracy to remove the gear from the fixture for filing.

The principal object of the present invention is to provide a gear testing fixture wherein corrections of inaccuracies may be made by appropriate operations by the tester during the test and without removing the gear from the fixture. A further object is to provide a device which shall be of very simple and inexpensive construction, characterized by fewness of parts and operable with greatest facility for effecting the usual and necessary tests of gears. Still another object is to provide a gear testing fixture wherein the gears are swung into mesh rather than slid into mesh, one of the gears being mounted on a fixed axis while the other gear is carried on one arm of a bell crank lever which may be rocked to bring the gears into and out of mesh. A further object is to provide in a fixture of this character means to support the gears during testing on horizontal axes so that ready access may be had to the teeth for grinding or other operations thereon. These and other objects will appear with greater particularity hereinafter in connection with the detailed description of a preferred embodiment illustrated in the drawing, wherein—

Figure 1:
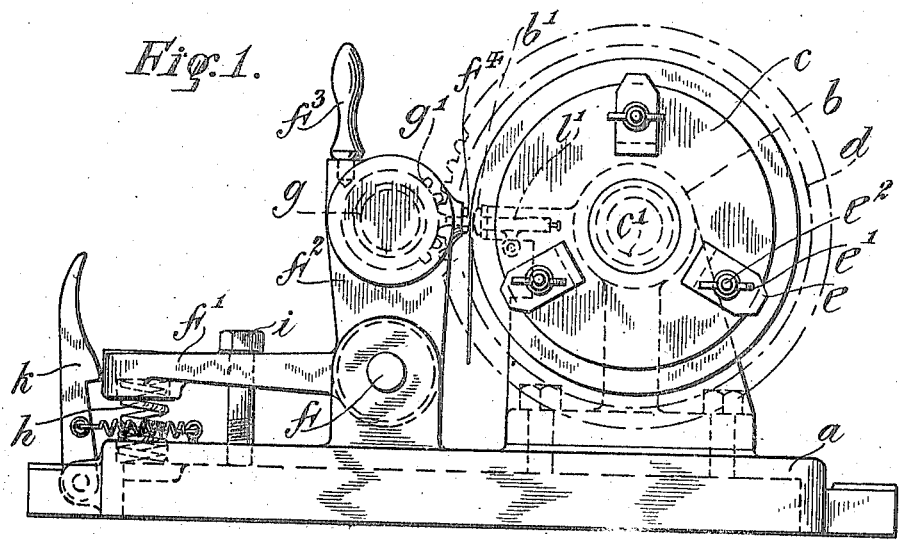
Figure 1 is a view in side elevation of the improved gear testing fixture.
Figure 2:
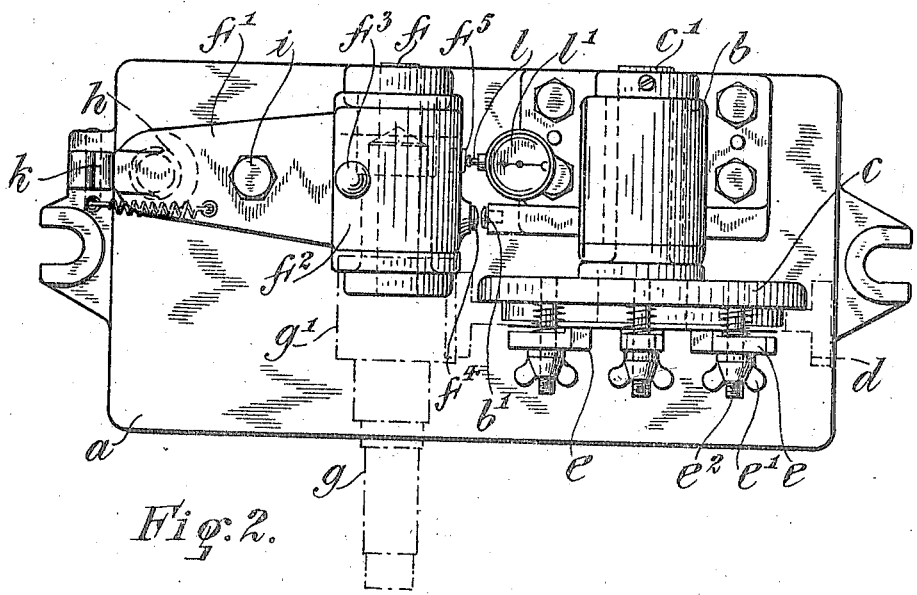
Figure 2 is a view in plan thereof.

The bed $a$ of the improved fixture has mounted thereon a journal bearing $b$ where- in is supported rotatably a supporting head $c$ for a master gear $d$. The supporting shaft $c'$ of the gear holder rests in a horizontal plane. On the face of the holder may be supported clamping pieces $e$ which are movable beyond the edge of the work holder $c$ for the purpose of overlying the rim of the gear $d$. Wing nuts $e'$ threaded on studs $e^2$ co-operate with the clamps $e$ in such manner as to permit ready manipulation thereof for the clamping or removal of the gear $d$.

On the bed $a$ is pivotally supported as on a shaft $f$, a bell crank lever having a horizontally disposed arm $f'$ and a vertically disposed arm $f^2$. The vertically disposed arm $f^2$ is adapted to receive a supporting shaft $g$, for a pinion $g'$ to be tested. The horizontally extending arm $f'$ has co-operating therewith a spring $h$ whereby the bell crank is rotated in a clockwise direction to force the pinion $g'$ into mesh with the gear $d$. An adjustable stop bolt $i$ may pass through the arm $f'$ and be threaded into the bed $a$ and co-operate with the arm so as to limit the movement of the bell crank under the action of the spring $h$. A spring-pressed latch $k$ may further co-operate with the arm $f'$ to lock it in depressed position against the action of the spring $h$, as when it is desirable to hold the pinion $g'$ out of mesh with the gear $d$. A handle $f^3$ may be secured to one or the other of the arms, such as $f^2$ of the bell crank, for convenient manipulation thereof.

Fixed on the journal head $b$ is a hardened gage point $b'$ which co-operates with the gage point $f^4$ carried on the vertical arm $f^2$ of the bell crank. On the arm $f^2$ may also be formed a suitable abutment $f^5$ for engagement with a plunger $l$ of a suitable indicator $l'$ which may also find support on the journal head $b$.

In using the fixture the initial setting of the indicator $l'$ for a correct indication of required centers is obtained by passing a feeler gage of predetermined thickness between the gage points $b'$, $f^4$, and then setting the indicator $l'$ to zero. The pinion $g'$ may then be supported on the arm $f^2$ and meshed with the gear $d$, the spring $h$ serving to hold the gears in firm mesh. The gears are rolled by hand. Lack of concentricity, errors in centers, and high and low points on the teeth will be indicated by deflections of the hand of the indicator $l'$ as usual. Corrections of errors may be made readily without removing either of the gears from the fixture by grinding or filing as will be understood. The horizontality of the axes of the gears makes these operations convenient since the teeth are exposed to view and in proper position for working. After a pinion has been tested the bell crank may be locked in retracted position by means of the latch $h$ while one pinion $g'$ is removed and another one inserted in the vertical arm $f^2$.

Matters which are of mechanical design and detail may be varied to meet different requirements of use without departing from the scope of the invention, the essence of which resides in the horizontality of the axes of the gears and the swinging of one gear with relation to another on a bell crank lever.

I claim as my invention:

1. A gear testing fixture including a rotatable head to support a master gear rotatably with its axis horizontal, means to support the head, a bell crank lever on one arm of which is supported a gear to mesh with the first named gear, means to support the bell crank lever, and an indicator having a plunger and mounted on the supporting means for the head with said plunger in operative relation to said bell crank lever to indicate irregularities when the gears are rotated.

2. A gear testing fixture including a journal bearing, a gear holder in which is mounted rotatably a master gear on a horizontal axis, a bell crank lever in one arm of which is journaled a gear to mesh with the first named gear, means to support the bell crank lever, co-operating gage points carried on the journal head and on one arm of the bell crank respectively, and an indicator having a plunger and mounted on the supporting means for the journal head with said plunger in operative relation to the bell crank to indicate errors when the gears are rotated.

3. A gear testing fixture including a journal head, a gear holder in which is mounted a master gear to rotate on a horizontal axis, a bell crank having a vertical arm to support a gear for mesh with the first named gear, means to support the bell crank, a spring co-operating with the other arm of said bell crank to hold the gears in mesh, co-operating gage points on the journal head and on the vertical arm of the bell crank, and an indicator having a plunger and mounted with the journal head with said plunger operatively engaged with the vertical arm of the bell crank to indicate errors when the gears are rotated.

4. A gear testing fixture including a gear holder mounted with a journal head to revolve on a horizontal axis, clamps carried thereon to engage a gear blank releasably, a bell crank lever having a vertical arm to support a second gear, means to support the bell crank lever, a spring co-operating with the other arm of the bell crank to hold the gears in mesh, means to limit the movement of the bell crank under the influence of said spring, and means to lock the bell crank against movement.

This specification signed this 31st day of Jan., A. D. 1921.

WALTER P. LOTZ.